Aug. 22, 1967     A. J. MESSINA     3,336,855

ULTRACLEAN WORK STATION

Filed Dec. 30, 1965     2 Sheets-Sheet 1

INVENTOR
ANTHONY J. MESSINA

BY *Lawrence D. Lerner*

ATTORNEY

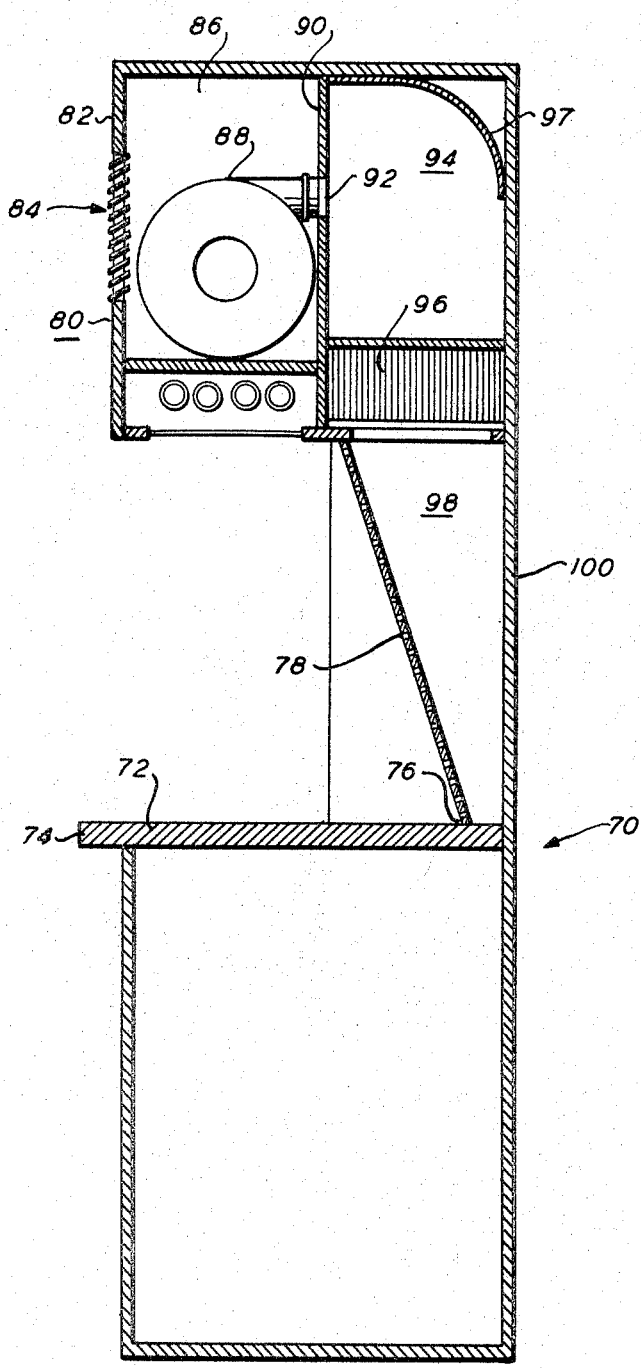

United States Patent Office 3,336,855
Patented Aug. 22, 1967

3,336,855
ULTRACLEAN WORK STATION
Anthony J. Messina, Linden, N.J., assignor to
Atmos-Tech Corporation
Filed Dec. 30, 1965, Ser. No. 517,766
7 Claims. (Cl. 98—115)

ABSTRACT OF THE DISCLOSURE

An ultraclean work station having a table top over which sterile air is to be continuously passed is provided with a plenum chamber extending vertically upward from the work table along the back edge thereof. The plenum chamber does not have an absolute filter therein, but rather an absolute filter and intake blower are mounted either above or below the plenum chamber and the filter is in communication with the plenum chamber. This allows for minimum depth for the station. The plenum chamber has an air wall along the back edge of the table, which air wall can be at an acute angle to the work table when the absolute filter and blower are mounted above the plenum chamber so that even a smaller over-all depth for the work station can be achieved with more uniform air flow over the surface of the work table.

In general, this invention relates to a new and improved ultraclean work station and, more particularly, a work station for providing a working surface continuously blanketed in a sterile air, which work station requires less floor space than utilized in the prior art, and, additionally, needs smaller absolute filters than has been required by prior ultraclean work stations having the same capacity.

In the past, ultraclean work tables have been provided utilizing absolute filters sometimes called superinterception or HEPA filters. These filters are characterized as "absolute" filters because of the extremely high dust retention characteristics of certain filter papers of which they are manufactured. These filter papers are composed of glass, ceramic, or cellulose-asbestos fibers and they are valued for their ability to remove the very smallest dust particles from air and gas streams at high efficiency. In fact, most commercially used absolute filters are 99.97% efficient with respect to all particles 0.3 micron or larger. These absolute filters have been placed along a wall facing the open edge of a work table. Normally, behind the absolute filter there is a plenum which is supplied with air from a blower or blowers mounted on the stand including the table which forms the ultraclean work station. Since the normal absolute filter is a minimum of 3 inches in depth and, more normally, is 6 inches in depth, and since, normally, at least a 4-inch deep plenum must be formed behind the absolute filter in order to insure uniform air passageway through the filter, there is added to the normal 2-foot depth of the work table an additional 10 inches in depth so that the ultraclean station has a depth of approximately 34 inches. This is a considerable amount of work space which must be taken up by a single station.

Further, the absolute filters utilized in the prior art had a height of between two and six feet in order that the entire work area above the table of the work station could be blanketed with sterile air. Since absolute filters are extremely expensive, this added considerably to the cost of the station.

Therefore, it is the general objects of this invention to provide a new and improved ultraclean work station utilizing absolute filters.

Another object of this invention is the provision of a new and better ultraclean work station which is less expensive to manufacture and requires smaller filters to achieve the same results as the prior art.

Still another object of this invention is the provision of a new and better ultraclean work station which is less expensive to manufacture without loss of efficiency over prior art devices and, additionally, saves on overall floor space taken up by the station.

Other objects will appear hereinafter.

The objects of the present invention are achieved by placing the absolute filter, normally positioned facing the open edge of the work table forming part of the ultraclean work station, in a compartment above or below the work table and merely providing a plenum area in the space formerly occupied by the absolute filter. By placing the absolute filter in a compartment above or below the work table, it is possible to maintain the air flow over the same area of the work table as in the prior art, but the filter need no longer be of the same height, but can be of a much smaller height as required by the dimensions of the compartment above or below the work table. Further, when the filter is placed above the work table, the wall facing the open edge of the work table can be inclined inwardly to form a tapered plenum, and, thus, further decrease the overall depth of the work station.

For the purpose of illustrating the invention, there are shown in the drawings forms which are presently preferred; it being understood, however, that this invention is not limited to the precise arrangements and instrumentalities shown.

FIGURE 3 is a cross-sectional view similar to FIGURE 2 of a second embodiment of the present invention.

Figure 1:
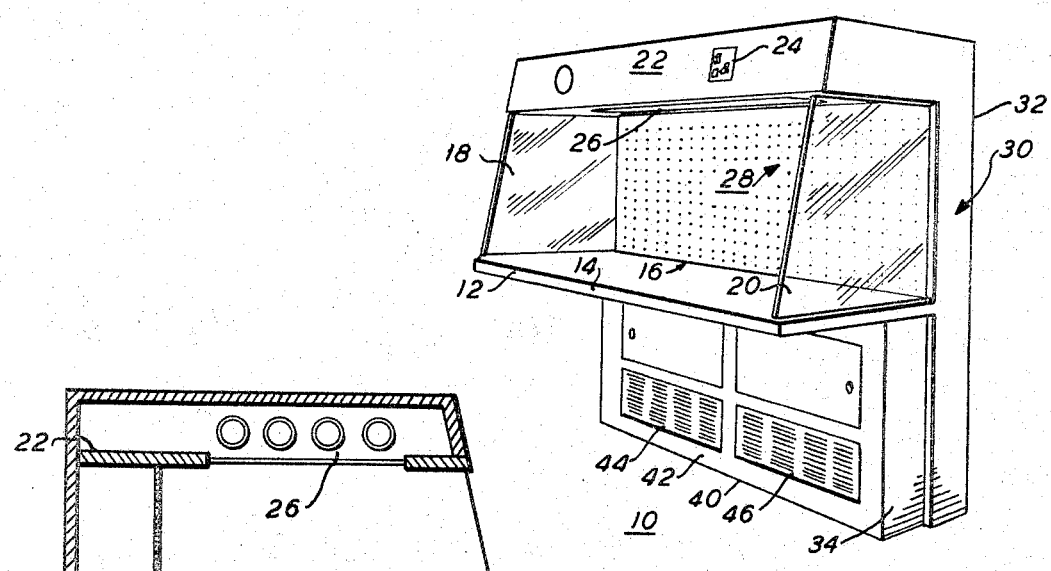
FIGURE 1 is a perspective view of a plenum type laminar flow ultraclean station built in accordance with the principles of the present invention.

In FIGURE 1, there is shown a plenum type laminar flow ultraclean work station built in accordance with the principles of the present invention and generally designated by the numeral 10. The station 10 includes a flat work table 12 having a front edge 14 and a back edge 16. The normal depth between front edge 14 and back edge 16 is approximately two feet. Support walls 18 and 20 extend upwardly from the opposite side edges of the work table 12 to support a top 22 for the station 10 which top normally includes a control panel 24 for turning on the blower to be discussed below and a light 26 utilized to illuminate the work surface. The support walls 18 and 20 are normally made of Plexiglas or a similar transparent material.

Extending upwardly from the back edge 16 of the work table there is provided a perforated aluminum air wall 28. The air wall 28 extends from the table 12 to the top 22 and from support wall 18 to support wall 20. In the past, an absolute filter has been placed immediately behind the air wall 28 to provide clean air across the surface of the table 12. In accordance with the present invention there is provided behind the air wall 28 a plenum area as defined by the air wall 28 side walls 30 and back wall 32 of the station 10. Side walls 30 extend from the top 22 down to and including a bottom support 34 for the table 14. The bottom support 34 for the table 14 includes spaced legs 36 and 38 which support the table 14 and a recessed compartment area 40 which includes a facing wall 42. Two spaced prefilters 44 and 46 are positioned in the lower portion of facing wall 42. Behind the prefilters 44 and 46 there is a compartment 48 within which are mounted to blower 50. Each blower 50 is resiliently mounted between the bottom wall 52 of the station 10 and a horizontal partition wall 54 so as to prevent the vibration of the table 12. Each blower 50 has its outlet mounted adjacent an opening 56 in the partition wall 54 which opening 56 connects the chamber 48 with a first plenum 58. Plenum 58, as one wall thereof, a portion of the facting wall 42. This portion 60 of the facing wall 42 is removable to allow access to the plenum 58.

The second blower (not shown) is mounted behind prefilter 44 between bottom wall 52 and horizontal partition wall 54 to also allow access to the plenum 58. The number of blowers required for any particular work station is dependent upon the width of the work station. Thus, for a work station two feet in width, only one blower is required. For a four feet wide work station, as shown in FIGURES 1 and 2, there are two blowers required and for a six feet wide work station three blowers are required.

The wall of the plenum 58 opposite from panel 60 is defined by one or more absolute or HEPA filters 62. The absolute filters 62 are operative to remove 99.97% of all particles 0.3 micron or larger. Further, it should be noted that the height of the filters 62 is determined by the size of the plenum 58 and is not dependent upon the height of the air wall 28. The absolute filter 52 faces a plenum 64 extending the width of the station 10 and which has an open top wall communicating with a plenum area 66 behind the air wall 28. The top wall 22 closes off the top of the plenum 66. Accordingly, in use, air enters through the prefilters 44 and 46 and is drawn through the blowers 50 in the compartment 48. The blowers 50 force the prefiltered air into the plenum 58 and through the HEPA filters 62. Thence, the air through the HEPA filters 62 passes through the plenums 64 and 66 and out the perforated air wall 28 to blanket the area above the table 12 with sterile air. All of the interior surfaces of the station 10 are vinyl coated to prevent sloughing off of particles into the air flow. Further, all of the exterior surfaces of the station 10 are plastic laminated to prevent accumulation of particles.

It will be noted that the height of the air wall 28 can vary in accordance with a particular use of the work station 10 and, in use, this height varies between two and six feet. However, this does not proportionately effect the height of the HEPA filters 62 and, accordingly, a substantial saving is achieved over prior art stations which required HEPA filters having a height equal to the height of the air wall 28. Further, the removal of the HEPA filters from behind the air wall 28, as was required in the prior art, has substantially reduced the overall depth of the cleaning station 10. Thus, the plenum 66, in a practical embodiment thereof was only four inches in width and, accordingly, the overall depth of the station utilizing a table two feet in depth was 28 inches. This compares to a comparable prior art work station which had a depth of 40 inches.

Figure 2:
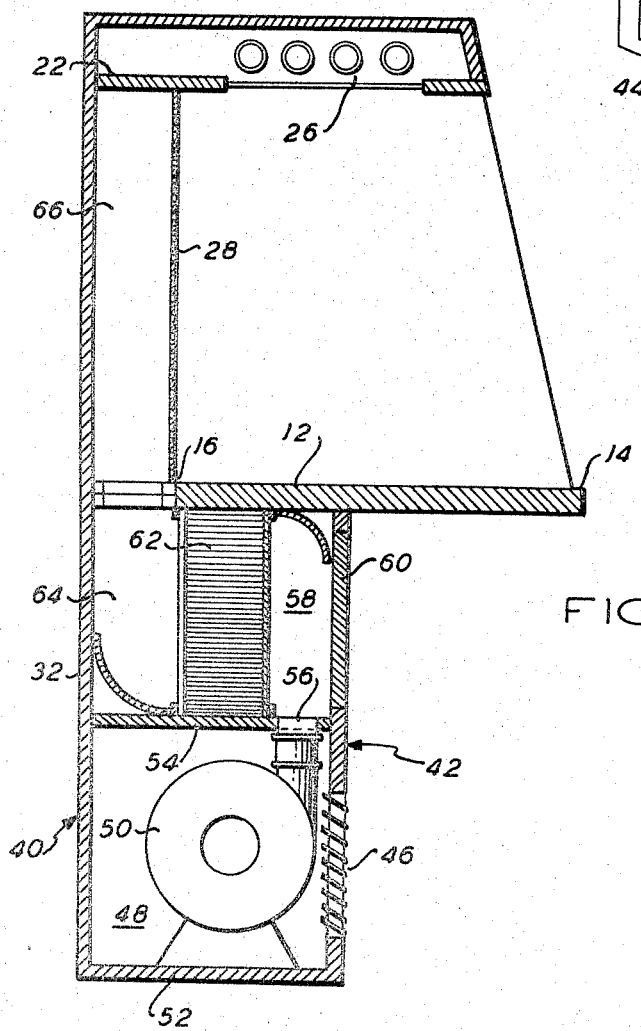
FIGURE 2 is a cross-sectional view of the station of FIGURE 1 taken along lines 2—2.

In FIGURE 3, there is shown another embodiment of the present invention in which a work station 70 is shown having a depth even smaller than that of the unit of FIGURES 1 and 2. In the embodiment of FIGURE 3, the table 72 is substantially the same as the table 12 in FIGURES 1 and 2 and has a front edge 74 and a back edge 76. A perforated aluminum air wall 78 has its lower edge contiguous with the back edge 76 of the work table 72. However, the perforated air wall 78 extends upwardly at an acute angle to the work table 72 and joins along its top surface the top portion 80 of the work station 26. The top portion 80 has a front wall 82 in which is positioned a prefilter 84 which prefilters air before it enters a blower compartment 86. In the blower compartment 86 there is provided at least one blower 88 for each prefilter 84. The blower 88 is resiliently mounted with its outlet connected to an opening 92 in the partition wall 90. Partition wall 90 aids in defining a plenum 94. A curvilinear baffle 96 is positioned adjacent the top wall of the plenum 94 so as to direct air forced by the blower 88 through the opening 92 into the plenum 94 in a downward direction and into the HEPA filter 96. The HEPA filter 96 forms the bottom wall of the plenum 94 and air passing therethrough enters a plenum area 98 behind the perforated air wall 78.

The back wall 100 of the station 70 was spaced from the bottom edge 76 of the table 72 a distance of only two inches in one preferred embodiment of the present invention. The perforated wall 78 extends from the bottom edge 76 to the edge of the HEPA filter 96 furthest from back wall 100. In the particular embodiment of the present invention mentioned previously, the HEPA filter was twelve inches wide.

Thus, the ultraclean work station 70 still maintains the old work area present in the embodiment of FIGURES 1 and 2 while the overall depth of the work station has been decreased an additional two inches. The tapered plenum 98 allows for uniform air flow through the air wall 78 because as the distance from the filter 96 increases, the area of the plenum decreases and, accordingly, the pressure of air flowing through the air wall 78 is maintained substantially constant.

The present invention may be embodied in other specific forms without departing from the spirit or essential attributes thereof and, accordingly, reference should be made to the appended claims rather than to the foregoing specification as indicating the scope of the invention.

I claim as my invention:

1. An ultraclean work station comprising a flat planar work table, a support under said table for maintaining said work table above ground in a horizontal disposition, an air wall extending upwardly from the back edge of the work table for the width of said work table, a back wall for said station spaced behind said air wall, said air wall and said back wall defining a plenum therebetween, said air wall having openings therein for allowing air from said plenum to pass over said work table, an absolute filter mounted on said station spaced from said plenum, a blower mounted on said station for receiving air from the ambient and passing the air through said absolute filter, said absolute filter having its outlet surface in communication with said plenum and an inlet surface in communication with said blower whereby ambient air is drawn by said blower and forced through said absolute filter into said plenum and thence through said air wall to pass now sterilized air over said work table, said blower being mounted on said support in a chamber defined by said support, a prefilter positioned in a wall above said chamber for prefiltering air drawn into said chamber by said blower, said absolute filter being also mounted in said support below said work table, said chamber having an opening in a wall thereof in communication with a second plenum, said blower having its outlet mounted on said last mentioned opening, said second plenum having as a wall thereof said absolute filter.

2. The ultraclean work station of claim 1 wherein, said second plenum having a second wall thereof removably mounted on said port to allow access to said second plenum to remove said absolute filter.

3. The ultraclean work station of claim 1 wherein the distance between the back edge of said work table and said back wall is less than 4 inches.

4. The ultraclean work station of claim 1 wherein the height of said absolute filter is equal to or less than one-half the height of said air wall.

5. An ultraclean work station comprising a flat planar work table, a support under said table for maintaining said work table above ground in a horizontal disposition, an air wall extending upwardly from the back edge of the work table for the width of said work table, a back wall for said station spaced behind said air wall, said air wall and said back wall defining a plenum therebetween, said air wall having openings therein for allowing air from said plenum to pass over said work table, an absolute filter mounted on said station spaced from said plenum, a blower mounted on said station for receiving air from the ambient and passing the air through said absolute filter, said absolute filter having its outlet surface in communication with said plenum and an inlet surface in communication with said blower whereby ambient air is drawn by said blower and forced through said absolute filter into said plenum and thence through said air wall to pass now sterilized air over said work table, said blower being mounted above said plenum, said absolute filter being mounted above said plenum, said blower being mounted in a compartment and having its outlet connected through an opening in the wall of the compartment to be in communication with said absolute filter.

6. The ultraclean work station of claim 5 wherein said air wall extends upwardly from said work table at an acute angle to said work table.

7. The ultraclean work station of claim 6 wherein said absolute filter is horizontally mounted between the top edge of said air wall and said back wall to form a top wall for said plenum.

References Cited

UNITED STATES PATENTS

| | | | |
|---|---|---|---|
| 2,709,954 | 6/1955 | Baker | 98—115 |
| 3,158,457 | 11/1964 | Whitfield | 98—115 |
| 3,229,611 | 1/1966 | Berger | 98—115 |
| 3,251,177 | 5/1966 | Baker | 98—115 |
| 3,252,400 | 5/1966 | Madl | 98—115 X |

MEYER PERLIN, *Primary Examiner.*

ROBERT A. O'LEARY, *Examiner.*

M. A. ANTONAKAS, *Assistant Examiner.*